May 16, 1950 T. HELME 2,508,259
BOTTLE TURNING CONVEYER FOR INSPECTION PURPOSES
Filed June 18, 1948
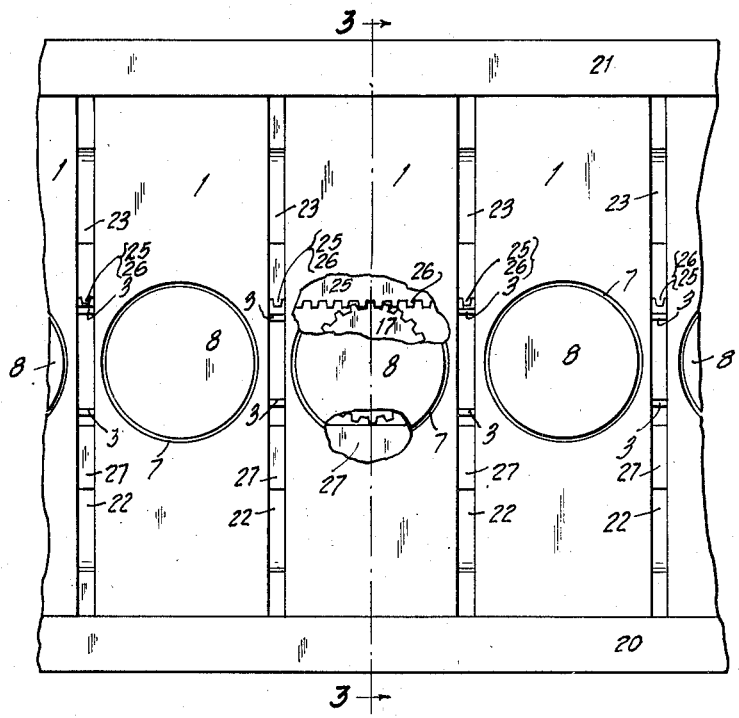
FIG. 1
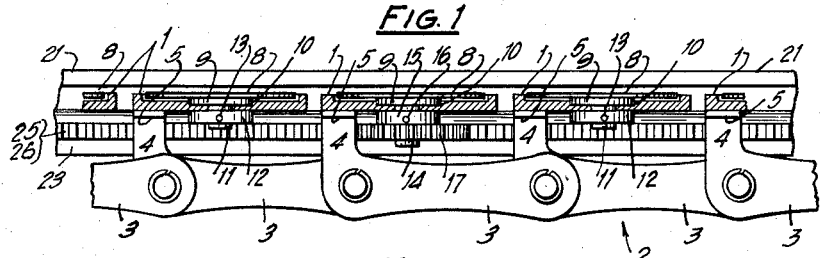
FIG. 2
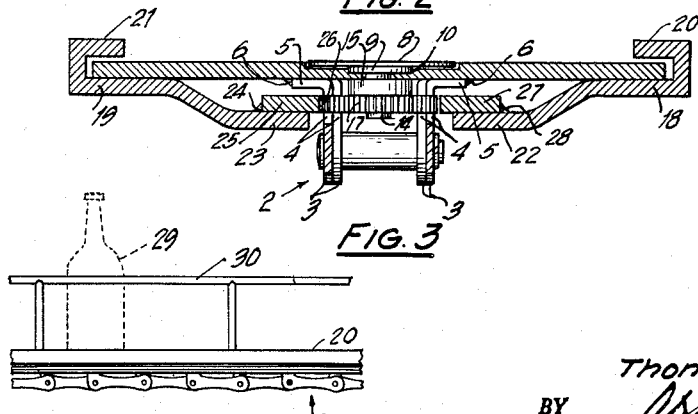
FIG. 3
FIG. 4
INVENTOR.
Thomas Helme
BY
ATTORNEY Patented May 16, 1950

2,508,259

UNITED STATES PATENT OFFICE 2,508,259

BOTTLE TURNING CONVEYER FOR INSPECTION PURPOSES

Thomas Helme, Albany, N. Y.

Application June 18, 1948, Serial No. 33,862

7 Claims. (Cl. 198—33)

In breweries and other bottling establishments, it is the usual practice to inspect the bottled product to see that there is no foreign matter in any of the bottles. At the present time, the bottles are carried past an inspection point on a conveyor in single file, or at least so that one bottle never is entirely behind another bottle, and are viewed by an inspector as they move along.

The fact that the bottles are not turned in any way as they pass the inspection point makes it difficult or impossible to detect foreign particles in certain parts of the bottle, particularly those parts which are tangent, or approximately tangent, to the line of sight. Therefore, some simple means of turning or oscillating the bottles, even to a slight degree, would greatly facilitate the proper inspection thereof. It is not necessary to impart any regular turning movement to the bottles; it being sufficient merely to turn them to some extent in either direction as they are passing the inspection point.

The present form of conveyor which is used in bottling works comprises a plurality of flat topped flights connected together in closely spaced relation by a driving chain. The ends of the flights slide in or on tracks which maintain them horizontal so that the bottles can be supported in upright position thereon.

One of the objects of my invention is to provide a conveyor of the general character described but which is provided with means for imparting a turning movement to the bottles supported on the flights as they are carried along. A further object is to provide a conveyor of this character in which at least some of the parts of the present conveying equipments, such for example as the driving mechanism, may be utilized in connection with my invention, thereby reducing the cost of installation thereof.

I accomplish these objects by means of the novel elements and the combinations and arrangements thereof described below and illustrated in the accompanying drawing in which:

Fig. 1 is a fragmentary, plan view of my conveyor with certain portions broken away;

Fig. 2 is a longitudinal section through the center of the conveyor with the exception that the chain is shown in side elevation;

Fig. 3 is a section of Fig. 1 in the plane 3—3; and

Fig. 4 is a small scale elevation view of the conveyor showing one bottle thereon.

Referring to the drawing:

My conveyor comprises a plurality of flat topped flights 1 which are secured together in closely spaced relation by the conveyor chain represented generally at 2. Each of the links 3 in the chain is provided at one end with an upstanding portion 4, the top of which is bent upwardly at right angles to form a shelf 5. The flights may be welded, as shown at 6, or otherwise secured, to the shelves 5.

Each of the flights in the central portion thereof is provided with a circular depression 7 adapted to receive a circular disk 8 which projects only slightly above the level of the top of the flight so that bottles may slide readily on and off the disk. Each of the disks 8 is provided, on the bottom, with a circular boss or hub 9 which rides in a circular depression 10 in the flight. It will be noted that the boss 9 rides on the bottom of the circular depression 10 and serves to maintain the other bottom portions of the disks 8 in slightly spaced relation to the portions of the flights beneath them. The disks 8 are provided with short, depending, centrally-disposed, stub shafts 11 which are rotatably mounted in centrally-disposed bearings in the flights, and are rotatably secured in the bearings in the flights by means of rings 12 and pins 13.

The other disks, which alternate with those just described, have somewhat longer stub shafts 14 and are rotatably secured in the flights by means of rings 15 and pins 16, but in this case, the rings 15 are formed integral with gears 17.

In order to support the flights in horizontal position to form the bottle carrying surface of the conveyor, there is provided at each side of the conveyor a rail, such as shown at 18 and 19, having portions 20 and 21, respectively, thereof over-hanging the ends of the flights. No supporting means for the rails is shown, but it is to be understood that any suitable means may be employed.

The rails 18 and 19 have inwardly and horizontally-extending, depending portions 22 and 23 which are spaced from each other at the center of the conveyor to permit the passage of the chain 2 therebetween. Welded, as shown at 24, or otherwise secured to the top surface of the depending portion 23 of the rail 19, is a longitudinally-extending rack 25 having teeth 26 adapted to mesh with the teeth on the gears 17 on alternate flights. In order to hold the gear teeth in mesh with the rack teeth, a flat plate 27, similar to the rack 25 but having no teeth thereon, is welded, as shown at 28, or otherwise secured, to the depending portion 22 of the rail 18.

and having its longitudinally-extending inward edge in close proximity to the gears 17 of the alternate flights.

From the foregoing it will be apparent that, as the flights are moved along the track by means of the usual driven sprockets (not shown) cooperating with the chain 2, the alternate flights having the disks therein which are provided with gears 17, will be rotated by the cooperation of the gears 17 with the rack 25, while the other disks will be free to rotate in either direction. Thus, when bottles in upright position are supported on the conveyor, as shown in dotted outline at 29 in Fig. 4, any portion of the bottom of the bottle which rests on one of the driven disks will have a turning movement imparted thereto, and this turning movement will be facilitated in those cases where another portion of the bottom of the bottle rests upon one of the non-driven disks. Thus, as the bottles pass the inspection point, irregular turning movements will be imparted thereto and the inspection of said bottles will be facilitated.

The rails may be provided with upstanding guards 30, as shown in Fig. 4, to prevent bottles from being accidentally knocked from the conveyor.

By turning or oscillating the bottles even to a slight degree as they pass through the line of vision of the inspector, portions thereof which are difficult to see through in one zone of their path will be turned sufficiently to bring such portions into view before they pass out of the reach of the inspector. In order best to accomplish this the transverse width of the bottle supporting surface of the conveyor should be substantially less than twice the diameter of the bottles anticipated to be carried thereby. That is to say, bottles may be of pint or quart size and if the disks or flights are of the same size the bottles will not be freely shiftable or movable if they do not bridge the gap between a driven and a freely rotatable disk. In other words, some of the bottles would reach a dead spot and not be rotated for inspection.

While I have described my invention in its preferred embodiment, it is to be understood that the words which I have used are words of description rather than of limitation and that changes, within the purview of the appended claims, may be made without departing from the true scope and spirit of my invention in its broader aspects.

What I claim is:

1. A conveyor adapted to carry bottled liquids past an inspection point and comprising a plurality of closely spaced flights adapted collectively to support a plurality of bottles thereon in upright position, a driving chain having links connected to and maintaining said flights in spaced relation, means rotatably mounted in each of said flights and forming a portion of the bottle supporting surface thereof, said rotatable means being of smaller diameter than said bottles and slightly raised above said flights so that said bottles are adapted to rest simultaneously on said flights and said rotatable means and are freely shiftable and movable thereon, means laterally disposed with respect to said flights to maintain said shiftable and movable bottles in position thereon, and means cooperating with said rotatably mounted means when said conveyor is in operation for positively rotating said means; whereby, a bottle, at least partially supported on said rotatably mounted means, will be turned as it is carried by said conveyor and inspection thereof will be facilitated.

2. A conveyor adapted to carry bottled liquids past an inspection point and comprising a plurality of closely spaced flights adapted collectively to support a plurality of bottles thereon in upright position, a driving chain having links connected to and maintaining said flights in spaced relation, means rotatably mounted in each of said flights and forming a portion of the bottle supporting surface thereof, said rotatable means being of smaller diameter than said bottles and slightly raised above said flights so that said bottles are adapted to rest simultaneously on said flights and said rotatable means and are freely shiftable and movable thereon, means laterally disposed with respect to said flights to maintain said shiftable and movable bottles in position thereon, and means cooperating with said rotatably mounted means in alternate flights when said conveyor is in operation for positively rotating said means; whereby, a bottle, at least partially supported on one of said means in said alternate flights will be turned as it is carried by said conveyor and inspection thereof will be facilitated.

3. A conveyor adapted to carry bottled liquids past an inspection point and comprising a plurality of closely spaced flights having flat upper surfaces adapted collectively to support a plurality of bottles thereon in upright position, a driving chain having links connected to and maintaining said flights in spaced relation, a disk rotatably mounted on a vertical axis in each of said flights with the top surface thereof projecting slightly above the upper surface of the flight and forming a substantial part of the bottle supporting surface of the flight, said disk being of smaller diameter than said bottles so that said bottles are adapted to rest simultaneously on said disks and said flights to be freely shiftable and movable thereon, a pinion on the axis of the disk in each alternate flight, and a stationary rack cooperating with said pinions for positively rotating said disks when said conveyor is in operation; whereby, a bottle, at least partially supported on one of said disks in each alternate flight will be turned as it is carried by said conveyor, and inspection thereof will be facilitated.

4. A conveyor adapted to carry bottled liquids past an inspection point and comprising a plurality of closely spaced flights having flat upper surfaces adapted collectively to support a plurality of bottles thereon in upright position, a driving chain having links connected to and maintaining said flights in spaced relation, a pair of rails on which said flights are slidably supported, a disk rotatably mounted on a vertical axis in each of said flights with the top surface thereof projecting slightly above the upper surface of the flight and forming a substantial part of the bottle supporting surface of the flight, said disk being of smaller diameter than said bottles so that said bottles are adapted to rest simultaneously on said disks and said flights to be freely shiftable and movable thereon, a pinion on the axis of the disk in each alternate flight, and a stationary rack cooperating with said pinions for positively rotating said disks when said conveyor is in operation; whereby, a bottle, at least partially supported on one of said disks in each alternate flight will be turned as it is carried by said conveyor, and inspection thereof will be facilitated.

5. In a conveyor adapted to carry a plurality of bottles in upright position past an inspection point, the combination with a plurality of flights having flat tops, of a pair of rails on which said flights are slidably supported, a disk rotatably mounted on a vertical axis in each of said flights and having its upper surface projecting slightly above the top of the flight and forming a substantial portion of the bottle supporting surface of said flight; said disks in alternate flights having driving pinions on the axes thereof, and the others of said disks being freely rotatable in either direction about their respective axes; a stationary rack extending longitudinally of said conveyor with which said pinions are in mesh, and means connecting said flights together for moving them longitudinally of said rails; whereby, in operation, the disks in alternate flights will be positively rotated by the cooperation of the pinions thereon with said rack and turning movements will be imparted to bottles at least partially supported on said rotating disks and inspection thereof will be facilitated.

6. The structure set forth in claim 5 in which the transverse width of the bottle supporting surface of said conveyor is substantially less than twice the diameter of the bottles anticipated to be carried thereby.

7. In a conveyor adapted to carry a plurality of bottles in upright position past an inspection point, the combination with a plurality of flights having flat tops, of a pair of rails on which said flights are slidably supported, a disk rotatably mounted on a vertical axis in each of said flights and having its upper surface projecting slightly above the top of the flight and forming a substantial portion of the bottle supporting surface of said flight; said disks in alternate flights having driving pinions on the axes thereof, and the others of said disks being freely rotatable in either direction about their respective axes; a stationary rack extending longitudinally of said conveyor with which said pinions are in mesh, and means connecting said flights together for moving them longitudinally of said rails; whereby, in operation, the disks in alternate flights will be positively rotated by the cooperation of the pinions thereon with said rack and turning movements will be imparted to bottles at least partially supported on said rotating disks and inspection thereof will be facilitated; said supporting surface being laterally limited and defined by portions upstanding from said rails adapted to confine the bottles on said conveyor to the space therebetween.

THOMAS HELME.

REFERENCES CITED

The following references are of record in the file of this patent:

UNITED STATES PATENTS

| Number | Name | Date |
|---|---|---|
| 1,540,021 | Knight | June 2, 1925 |
| 2,376,161 | Maud et al. | May 15, 1945 |
| 2,409,341 | Borg | Oct. 15, 1946 |